United States Patent
Schaefer et al.

(10) Patent No.: US 6,569,482 B2
(45) Date of Patent: *May 27, 2003

(54) METHOD FOR SURFACE TREATING ANIMAL TISSUE

(75) Inventors: Daniel L. Schaefer, Maize, KS (US); Jerome D. Leising, Shorewood, MN (US); M. James Riemann, Derby, KS (US)

(73) Assignee: Excel Corporation, Wichita, KS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,013

(22) Filed: Oct. 30, 1998

(65) Prior Publication Data
US 2002/0004091 A1 Jan. 10, 2002

(51) Int. Cl.[7] .......................... A23C 17/00; A23B 4/005
(52) U.S. Cl. .................. 426/509; 426/438; 426/521; 426/641; 426/644; 426/646
(58) Field of Search .................. 426/509, 641, 426/644, 646, 438, 521

(56) References Cited

U.S. PATENT DOCUMENTS

| 603,082 A | 4/1898 | Henkel et al. |
|---|---|---|
| 1,007,908 A | 11/1911 | Ahrens |
| 1,146,589 A | 7/1915 | Morrison |

(List continued on next page.)

FOREIGN PATENT DOCUMENTS

| FR | 2 603 775 | 3/1988 | |
| GB | 338768 | 11/1930 | |
| GB | 1072430 | 6/1967 | |
| GB | 1199557 | 7/1970 | |
| GB | 2 182 461 A | 5/1987 | |
| GB | 2 240 912 A | 8/1991 | |
| JP | 58-162264 A | 9/1983 | |
| JP | 58162264 | * 9/1983 | |
| JP | 10165086 A | 6/1998 | |
| SU | 405518 | * 8/1971 | ................. 426/509 |
| WO | 95/12320 | 5/1995 | |

OTHER PUBLICATIONS

Rombauer, Irma., 1975, Joy of Cooking, "Removing fat from soup". The Bobbs–Merrill Co., Inc. N.Y., p. 168.*

Gill, C.O. et al., "The hygienic and organoleptic qualities of ground beef prepared from manufacturing beef pasteurized by immersion in hot water", *Meat Science*, 46(1):67–75 (1997).

Humphrey, T.J. et al., "The effect of pH adjustment on the microbiology of chicken scald–tank water with particular reference to the death rate of salmonellas", *Journal of Applied Bacteriology*, 51:517–527 (1981).

Sachindra, N.M. et al., "Reduction in microbial load on buffalo meat by hot water dip treatment", *Meat Science*, 48(1/2):149–157 (1998).

Smith, M.G. et a., Destruction of *Escherichia coli* on sides of beef by a not water decontamination process *Food Australia* 42(4):195–198 (Apr. 1990).

(List continued on next page.)

*Primary Examiner*—Helen Pratt
(74) *Attorney, Agent, or Firm*—Merchant & Gould P.C.

(57) ABSTRACT

A method for surface treating animal tissue is provided by the invention. The method includes the steps of providing animal tissue having an average size of between about 0.5 inch and about 16 inches in length, introducing the animal tissue into a bath provided at a temperature of between about 80° C. and about 150° C. for between about 25 seconds and about 150 seconds, and recovering the animal tissue from the water bath. A pasteurization unit is provided for continuous processing of animal tissue.

15 Claims, 3 Drawing Sheets

U.S. PATENT DOCUMENTS

| | | | |
|---|---|---|---|
| 1,850,031 | A | 3/1932 | Rayson |
| 1,848,596 | A | 8/1932 | Allbright |
| 2,060,423 | A | 11/1936 | McKee et al. |
| 2,631,520 | A | 3/1953 | Geerling |
| 2,978,738 | A | 4/1961 | Jönsson |
| 3,013,887 | A | 12/1961 | Eolkin |
| 3,135,016 | A | 6/1964 | Erkstam et al. |
| 3,178,763 | A | 4/1965 | Kolman |
| 3,272,632 | A | 9/1966 | Speer |
| 3,522,058 | A | 7/1970 | Libby |
| 3,523,326 | A | 8/1970 | Ambill |
| 3,532,508 | A | 10/1970 | Zevenaar |
| 3,631,563 | A | 1/1972 | Snowden |
| 3,663,233 | A | 5/1972 | Keszler |
| 3,694,856 | A | 10/1972 | Kaufman et al. |
| 3,705,813 | A | 12/1972 | Vogel |
| 3,900,575 | A | 8/1975 | Rapoport |
| 3,934,044 | A | 1/1976 | Busch et al. |
| 3,961,090 | A | 6/1976 | Weiner et al. |
| 3,996,386 | A | 12/1976 | Malkki et al. |
| 4,045,579 | A | 8/1977 | Rogers |
| 4,234,537 | A | 11/1980 | Hersom et al. |
| 4,254,152 | A | 3/1981 | Janovtchik |
| 4,255,459 | A | 3/1981 | Glen |
| 4,337,549 | A | 7/1982 | Anderson et al. |
| 4,342,788 | A | 8/1982 | Clatfelter |
| 4,473,004 | A | 9/1984 | Wells et al. |
| 4,525,368 | A | 6/1985 | Bengtsson et al. |
| 4,525,370 | A * | 6/1985 | Parkes ........................ 426/509 |
| 4,539,212 | A | 9/1985 | Hunter |
| 4,556,572 | A | 12/1985 | Kaufman, Jr. et al. |
| 4,636,395 | A | 1/1987 | Robinson, Jr. et al. |
| 4,731,908 | A | 3/1988 | Thorsen |
| 4,760,780 | A | 8/1988 | Silvestrini et al. |
| 4,829,637 | A | 5/1989 | Norrie |
| 4,849,237 | A | 7/1989 | Hurst |
| 4,868,950 | A | 9/1989 | Harben, Jr. |
| 4,902,522 | A | 2/1990 | Rudibaugh |
| RE33,174 | E | 3/1990 | Whittle |
| 4,921,719 | A * | 5/1990 | Kohlbach ................... 426/521 |
| 4,927,653 | A | 5/1990 | Manvell |
| 4,933,200 | A | 6/1990 | Shimizu |
| 4,965,911 | A | 10/1990 | Davey |
| 4,966,072 | A | 10/1990 | Ellis-Brown |
| 5,043,175 | A | 8/1991 | Bayley et al. |
| 5,045,021 | A | 9/1991 | Borup |
| 5,072,663 | A | 12/1991 | Ellis-Brown |
| 5,093,140 | A | 3/1992 | Watanabe |
| 5,184,538 | A | 2/1993 | Ledet |
| 5,281,428 | A | 1/1994 | Morgan |
| 5,366,746 | A | 11/1994 | Mendenhall |
| 5,439,694 | A | 8/1995 | Morris, Jr. |
| 5,458,901 | A | 10/1995 | Eagler et al. |
| 5,470,597 | A | 11/1995 | Mendenhall |
| 5,503,594 | A | 4/1996 | Karubian et al. |
| 5,607,349 | A | 3/1997 | Karubian et al. |
| 5,651,730 | A | 7/1997 | McGinnis et al. |
| 5,711,981 | A | 1/1998 | Wilson et al. |

OTHER PUBLICATIONS

Thompson, J.E. et al., "Phosphate and heat treatments to control salmonella and reduce spoilage and rancidity on broiler carcasses", *Poultry Science*, 58:139–143 (1979).

Davey, K.R. et al., "A laboratory evaluation of a novel hot water cabinet for the decontamination of sides of beef", *International Journal of Food Science and Technology*, vol. 24, pp. 305–316 (1989).

* cited by examiner

US 6,569,482 B2

METHOD FOR SURFACE TREATING ANIMAL TISSUE

FIELD OF THE INVENTION

The present invention relates to a method and apparatus for surface treating animal tissue. More particularly, the invention relates to the use of hot water submersion techniques for reducing bacterial populations on the surface of animal tissue.

BACKGROUND OF THE INVENTION

There exists concern about pathogenic and enteric bacteria in animal meat, and, in particular, ground beef. As a consequence of processing animals into meat for human consumption, the surface of the animal carcass may become contaminated with bacteria from many sources including processing equipment, workers, and the environment. The predominant source for bacterial contamination is the animal itself. The hide, hooves, intestinal contents, and milk have the potential to harbor not only large numbers of bacteria but also pathogenic bacteria. Techniques have been utilized for reducing bacterial contamination of the animal carcass. For example, International Publication No. WO 96/13983 describes an apparatus for steam pasteurization of the surface of meat carcasses. Other techniques for reducing the contamination of the carcass surface involves trimming defined areas on the carcass, and washing the carcass with both hot and cold water. These techniques are described by Phebus et al., "Comparison of Steamed Pasteurization and Other Methods for Reduction of Pathogens on Surfaces of Freshly Slaughtered Beef," *Journal of Food Protection*, vol. 60, no. 5, 1997, pages 476–484. Techniques for treating buffalo meat cuts from shoulder and leg portion in hot water at 70° C. and 80° C. for 30 to 60 seconds is described by Sachindra et al., "Reduction in Microbial Load on Buffalo Meat By Hot Water Dip Treatment," *Meat Science*, vol. 48, no. 1/2, pages 149–157, 1998.

Bacterial populations have the opportunity to form on the exposed carcass surface. A large percentage of the trimmings which are processed for human consumption are obtained from this exposed carcass surface. It has been found that *E. coli* bacteria, and many pathogens, can reside on the surface of carcass beginning with the carcass processing. The pathogens can originate from fecal matter and other contaminants on the surface of the meat. Without adequately destroying these pathogens, the meat is processed, and shipped to the distributor, retailer, or consumer. It is then left for the consumer or preparer of the meat to address the problem that by then can be even worse. The bacteria may have further multiplied. Ground meats are very susceptible to bacteria growth because the surface pathogens can be distributed throughout the meat during processing.

SUMMARY OF THE INVENTION

A method for surface treating animal tissue is provided by the present invention. The method includes steps of: providing animal tissue having an average size of between about 0.5 inch and about 16 inches in length; introducing the animal tissue into a fluid bath provided at a temperature of between about 80° C. and about 150° C. for between about 25 seconds and about 50 seconds; and recovering the animal tissue from the water bath.

The animal tissue which can be processed by the method of the invention can include beef, poultry, swine, sheep, horse and wild game. The animal tissue can be introduced into the fluid bath immediately or shortly after the slaughter or fabrication operation, or after the animal tissue has been cooled or chilled. In the case of animal tissue introduced shortly after the slaughter or fabrication operation, it is expected that the animal tissue will have a temperature of between about 30° C. and about 40° C. In the case of animal tissue which has been cooled or chilled, it is expected that the animal tissue will have a temperature of between about 0° C. and 10° C.

The animal tissue is preferably advanced through the fluid bath in a first in and first out arrangement. It should be appreciated that a first in and first out arrangement reflects the situation where portions of animal tissue do not remain or build up within the hot fluid bath. That is, tissue enters the hot fluid bath and then is removed after the desired level of surface treatment. In order to provide a first in and first out arrangement, the animal tissue is preferably advanced or conveyed through the water bath using a rotation screw having a spiral flight extending from a first end to a second end for advancing the animal tissue. Preferably, the rotation screw rotates at a rate of about one revolution per minute and about 20 revolutions per minute.

While the preferred heating media or bath is water, it should be appreciated that other types of heating media can be used including tallow. When water is used as the heating medium, it is preferable to provide the hot water at a temperature of between about 80° C. and 110° C., and to provide a surface treating period of between about 25 seconds and about 50 seconds. In the case of using tallow as a heating media, it may be appropriate to increase the treatment time if the temperature of the heating media is maintained at between about 80° C. and about 110° C. Accordingly, at this temperature, it may be appropriate to surface treat the animal tissue for a period of between about 25 seconds and about 150 seconds. Alternatively, the tallow can be provided at a higher temperature to provide a shorter treatment period. For example, the tallow can be provided at a temperature of between about 115° C. and 150° C. in order to provide a treatment time which is between about 25 seconds and 50 seconds. In addition, the size of the animal tissue can be characterized in terms of weight. Preferably, the average weight of a piece of animal tissue is between about 0.25 lb. and about 12 lbs.

The invention relates to a method for preparing ground beef. The method includes the steps for surface treating animal tissue followed by a step of processing the recovered animal tissue to provide ground beef.

A pasteurization unit is provided by the present invention. The pasteurization unit includes a hot media containing trough, a rotation screw, and a motor for driving the rotation screw. The hot media containing trough has an animal tissue inlet at a first end, and an animal tissue outlet at a second end. The hot media containing trough is preferably constructed and arranged for holding hot media and animal tissue having an average size of between about 0.25 lb. and about 12 lbs. per piece of animal tissue, and for providing surface treating of the animal tissue. By "hot media" it is meant that the temperature of the media is provided at a temperature which is sufficient to provide lethal action on the bacterial populations which may be present on the present of the animal tissue during the time of surface treating the animal tissue. In general, it is expected that the media will be provided at a temperature of between about 80° C. and about 150° C. under most desirable periods for surface treating the animal tissue. Preferably, the media includes water, and may include fat or tallow. The rotation screw is provided having a spiral flight extending from the first end to the second end. The spiral flight is provided for advancing the animal tissue from the first end to the second end. The motor is provided for driving the rotation screw at a speed of between about one and about 20 revolutions per minute. Preferably, the pasteurization unit includes hot media inlet ports along a length of the hot water containing trough or introducing hot media into the hot media containing trough.

DETAILED DESCRIPTION OF THE PREFERRED EMBODIMENT

Figure 1:
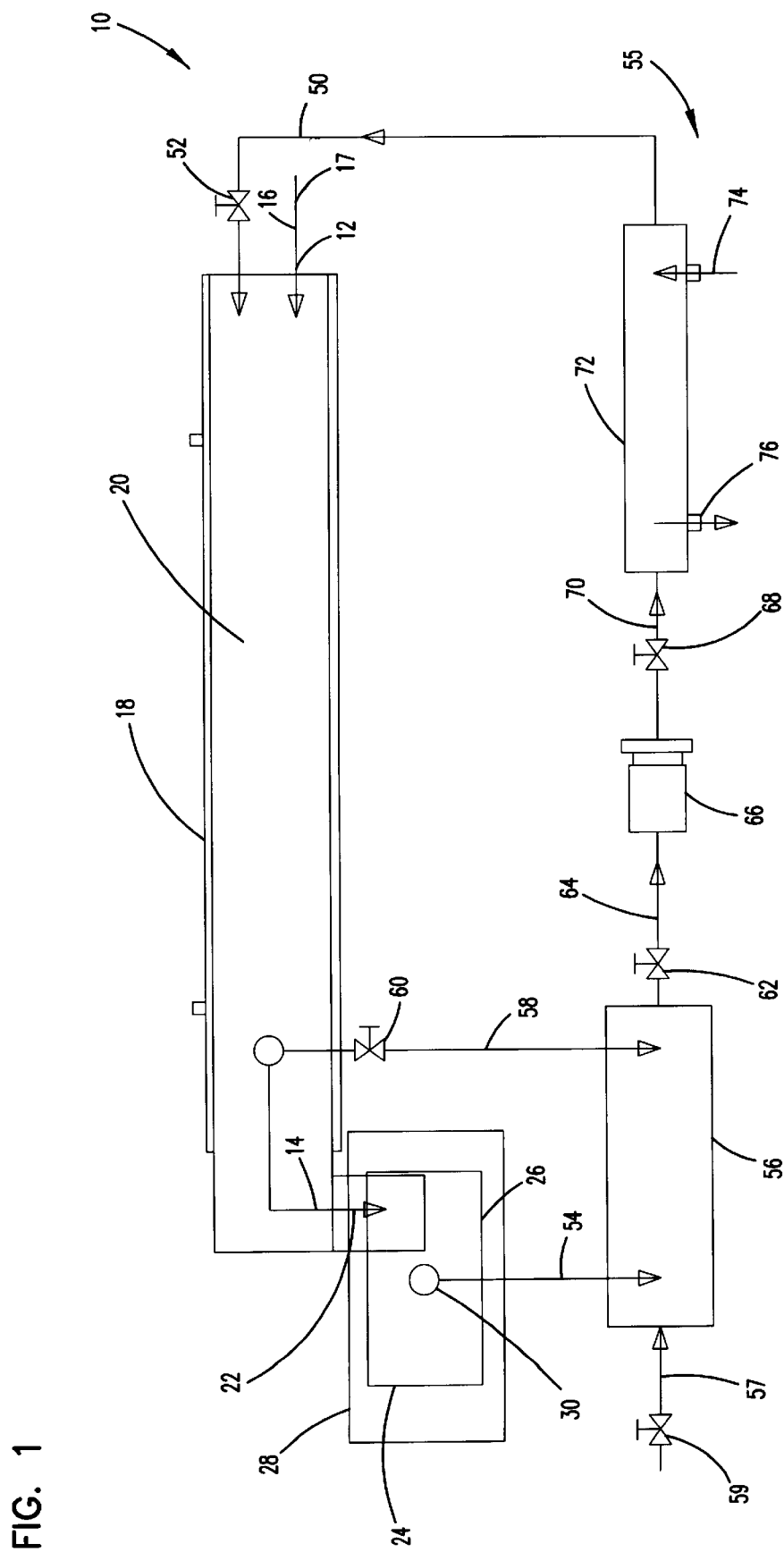
FIG. 1 is a schematic plan view of the method and apparatus for surface treating animal tissue according to principles of the present invention.

Now referring to FIG. 1, a schematic diagram of a preferred embodiment of the method and apparatus for surface treating animal tissue is provided at reference numeral 10. It should be appreciated that while the invention is described in the context of surface treating animal tissue, the surface treatment is provided to reduce pathogenic bacterial populations on the surface of animal tissue if such bacterial populations are present. It is not necessary that a particular animal tissue which is processed according to the invention contains at least a minimal amount of pathogenic bacteria. It is expected that most animal tissue processed according to the invention will be essentially free of pathogenic bacteria. In the context of processing animal tissue for human consumption, it is expected that there may be a possibility, at some time, that pathogenic bacteria may exist on the surface of the animal tissue. Accordingly, the present invention is provided to destroy bacterial populations, if they exist, before the animal tissue is further processed or reaches the consumer.

It should be appreciated that the phrase "animal tissue" is meant to describe relatively small portions of tissue obtained as a result of the slaughter and fabrication operation. In general, these small portions include trimmings from animal carcasses. It is expected that the small portions of animal tissue will have a size ranging from about 0.5 inch to about 16 inches in length. It should be understood that the length of animal trimmings refers to the longest dimension. In general, the animal tissue which can be processed according to the invention will generally have an average weight of between about 0.25 lbs and about 12 lbs. per tissue piece. Animal tissue can be obtained from several types of animal species including cattle, swine, sheep, poultry, horse, and wild game. It should be appreciated that the small portions of tissue do not include the entire carcass of large animals such as cattle and swine, but may include the entire carcass of poultry.

The apparatus for surface treating animal tissue 10, according to the invention, includes a tissue inlet 12, a tissue outlet 14, and a surface treating or pasteurization unit 18. It should be appreciated that the invention relates to the processing of animal tissue 16 to increase the degree of certainty that pathogenic bacterial populations are sufficiently reduced or lowered thereby increasing the overall safety of the animal tissue as a food product, or as a pharmaceutical or animal feed product.

The animal tissue 16 is continuously introduced into the pasteurization unit 18 at the tissue inlet 12. The animal tissue 16 is provided by a conveyor 17 and dropped into the hot water 20 within the pasteurization unit 18. The hot water is preferably provided at a temperature which is sufficient to kill pathogenic bacterial populations which may be present on the surface of the animal tissue 16 in the amount of time the tissue is provided within the pasteurization unit 18. In general, the hot water should be provided at a temperature of between about 80° C. and about 110° C. in order to provide desired lethal action on the bacterial populations which may be present on the surface of the animal tissue.

As the animal tissue 16 passes through the pasteurization unit 18, it is expected that the animal tissue may pick up water during the heat treatment process. The heat treated tissue 22 is recovered from the pasteurization unit 18 and passes through a strainer 24 where the water is allowed to drain therefrom. Preferably, the strainer 24 includes a drain screen 26 and a shaker 28. While the heat treated tissue 22 is provided in the strainer 24, the agitation created by the shaker 28 causes excess water to drain into a water catch pan 30 where it is subsequently removed via the water discharge line 54.

The heat treated tissue 22 which is recovered from the pasteurization system 10 is then processed into edible products for human consumption. For example, the heat treated tissue 22 can be processed in a low temperature rendering process such as the process described by U.S. Pat. No. 5,725,897, the disclosure of which is incorporated herein by reference in its entirety. Alternatively, the heat treated tissue 22 can be ground and processed into ground beef product as described, for example, by Judge et al., *Principles of Meat Science*, 1989, pages 135–174, and Price et al., *The Science of Meat and Meat Products*, 3d Edition, 1986, pages 431–457. Furthermore, the heat treated animal tissue 22 can be processed into other meat products or used for pharmaceuticals or animal feed.

The water temperature provided within the pasteurization unit 18 is preferably provided within a range of between about 80° C. and about 110° C. Applicants have discovered that by providing the water at a temperature within this range, and that by providing the animal tissue 16 within the pasteurization unit 18 for between about 25 and about 50 seconds, the desired degree of pasteurization of the surface of the animal tissue 16 can be obtained. Hot water is fed to the pasteurization unit 18 through the hot water inlet line 50. The flow of the hot water through the inlet line 50 is controlled by the flow adjusting valve 52. Water is recovered from the pasteurization unit 18 via water discharge line 54. Because the pasteurization unit 18 runs at steady state, the introduction of a mass of water into the pasteurization unit causes the removal of the same mass of water therefrom. Water can leave the system as vapor and a certain amount of water is expected to be absorbed by the animal tissue 16. The remaining amount of water flows out of the pasteurization unit along with the heat treated tissue 22 and is recovered in the water catch pan 30. Water recovered in the water catch pan 30 then flows via water discharge line 54 into surge tank 56. An additional water recovery line 58 is provided. When the valve 60 is open, water within the pasteurization unit 18 flows into the surge tank 56. This allows for easy draining of the pasteurization unit 18 for cleaning.

The water which is introduced into the pasteurization unit 18 and recovered therefrom can be referred to as processing water. While the embodiment of the invention depicted in FIG. 1 includes a recycle stream 55 for the processing water, it should be appreciated that the invention can be practiced without the recycle stream. That is, processing water from the pasteurization unit 18 can be discarded, and fresh heated water can be introduced into the pasteurization unit 18. Furthermore, the surge tank 56 is advantageous for allowing fat buildup in the processing water to overflow. To assist the overflow of fat, water can be added via line 57 at a rate controlled by the valve 59 to cause overflow of excess fat from the surge tank 56. In addition, the line 57 can be relied upon for introducing water for making up the water which is evaporated or otherwise lost during the processing.

The processing water recovered in the surge tank 56 and the make up water are processed and introduced into the pasteurization unit 18 for further processing of animal tissue 16. A valve 62 is provided which controls the flow of water through the pump inlet line 64 and into the recirculation pump 66. Under pressure, water then passes through valve 68 and pump outlet line 70 and then through the heat exchanger 72. The heat exchanger 72 includes a steam inlet 74 and a condensation outlet 76 for heating the water. Heated water 78 then flows out of the heat exchanger 72 for introduction into the pasteurization unit 18.

Figure 2:
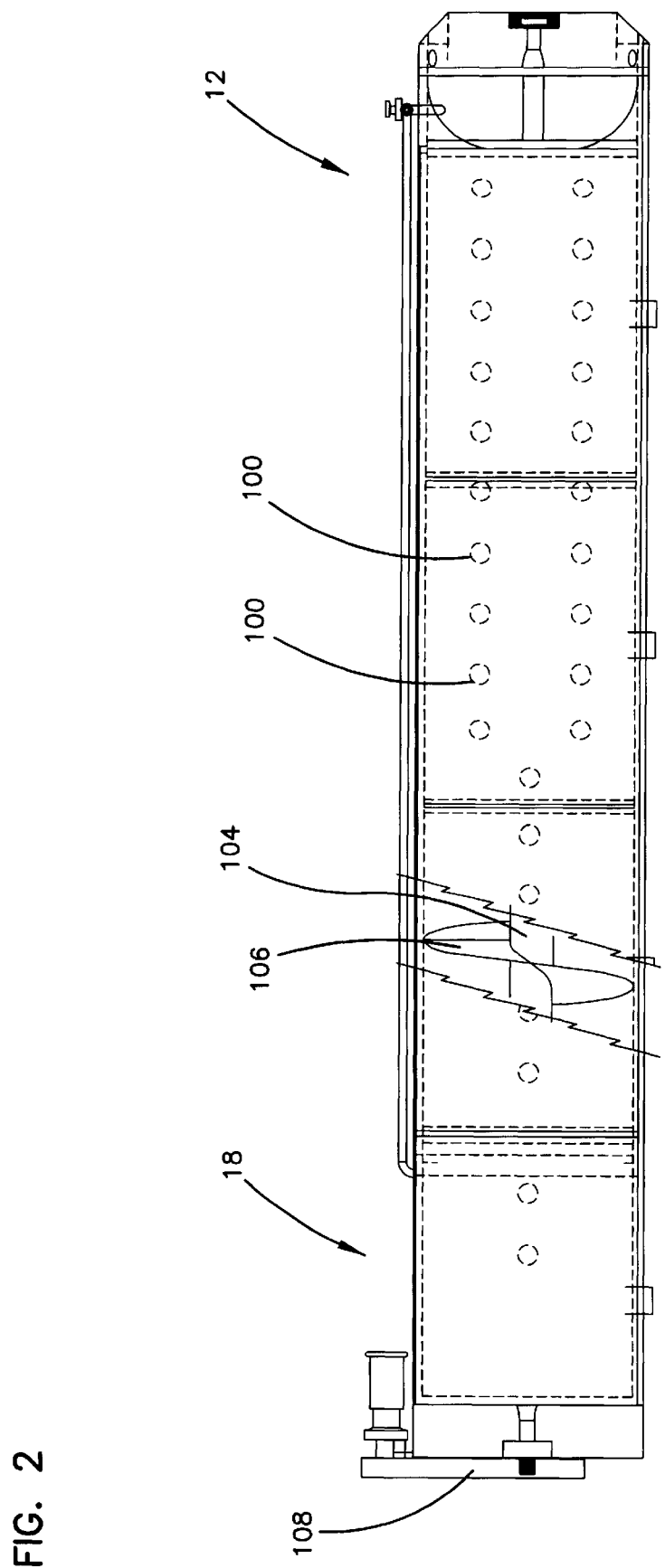
FIG. 2 is a top view of the pasteurization unit provided in FIG. 1.
Figure 3:
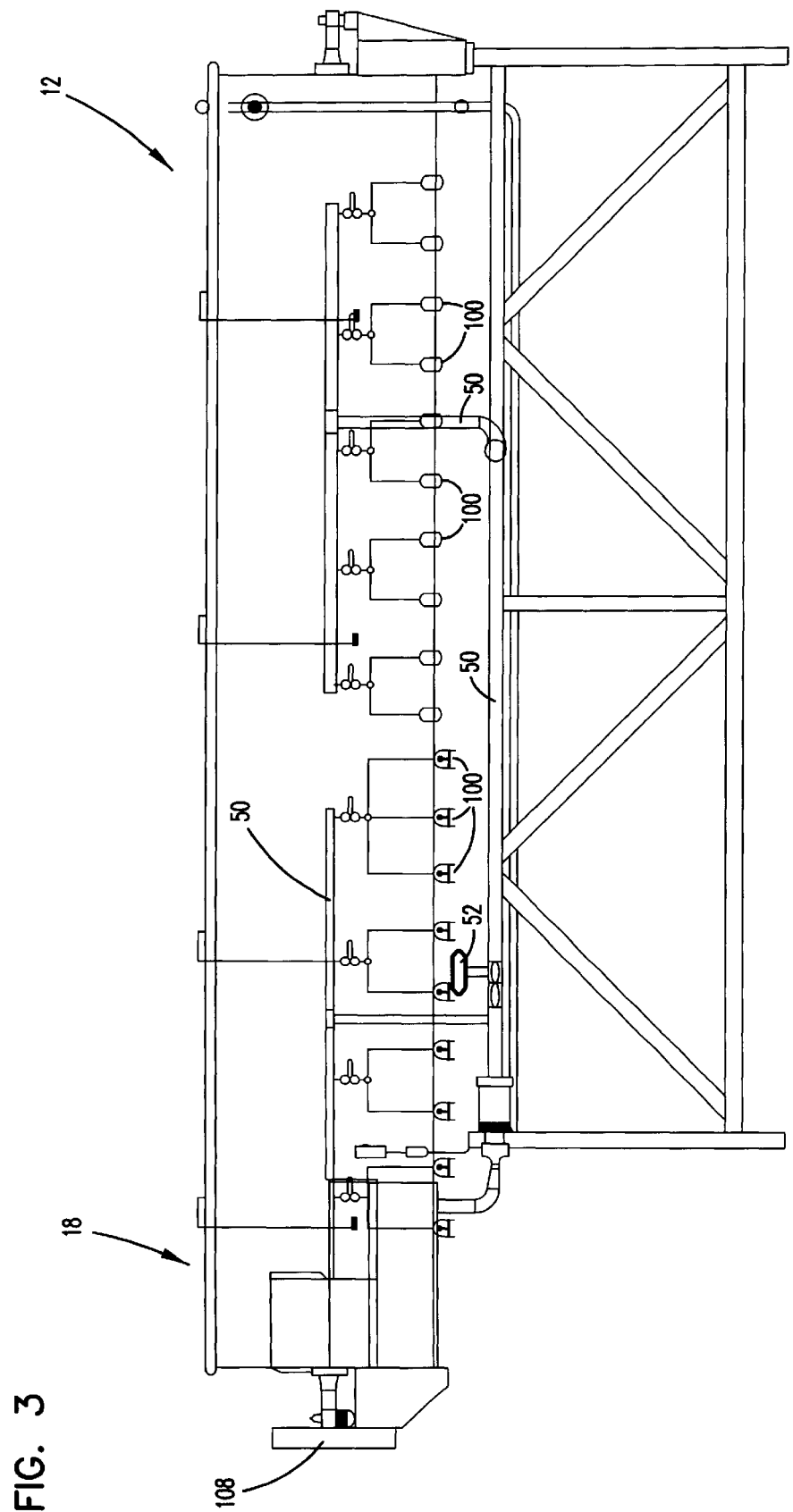
FIG. 3 is a side view of the pasteurization unit of FIG. 1.

Now referring to FIGS. 2 and 3, the pasteurization unit 18 is shown in detail. The hot water is introduced into the pasteurization unit 18 via injection ports 100. A greater number of injection ports 100 are provided near the tissue inlet 12 in order to control the temperature across the length of the pasteurization unit. Because the animal tissue 16 is provided at a much lower temperature than the water within the pasteurization unit 18, additional energy or heat should be provided near the inlet region. Along the length of the pasteurization unit 18, a screw 104 is provided for advancing the animal tissue 16 along the length of the pasteurization unit. The screw 104 includes a spiral flight 106. As the screw 104 rotates, the spiral flight 106 causes the animal tissue 16 to move along the length of the pasteurization unit 18. This causes the animal tissue 16 to advance through the pasteurization unit 18 on a first in first out basis thereby preventing overtreatment of certain pieces of animal tissue 16. The speed of the screw 104 is adjusted to provide the desired residence time within the pasteurization unit 18. It should be appreciated that the desired residence time is a function of the temperature of the water within the pasteurization unit 18. In the case of water provided at a temperature of between about 80° C. and about 110° C., it is desirable to provide a residence time of between about 25 seconds and about 50 seconds, and more preferably between about 30 seconds and about 45 seconds. For a screw having a solid flight at a 12 inch pitch, this relates to a screw speed of 8–9 revolutions per minute for a pasteurization unit having a length of about 10 feet. The screw 104 preferably driven by a variable speed motor 108 which can be adjusted to provide the desired tissue retention time within the pasteurization unit 18.

At the outlet end of the pasteurization unit 18, the final edge of the flight pushes the animal tissue above the water level and out onto the strainer 24. The water is then recovered and recirculated into the pasteurization unit 18. The heat treated tissue 22 is then recovered and further processed by, for example, those techniques previously described.

It should be appreciated that the purpose of the pasteurization unit is to provide a relatively fast heat treatment of the animal tissue in order to reduce the incidence of pathogenic bacteria while retaining the desired organoleptic properties of the animal tissue. In particular, it is desirable to provide at least one log reduction in the aerobic plate counts on the surface of the animal tissue, and to provide at least a two log reduction in pathogenic bacteria when tested using inoculated samples. It is expected that the animal tissue will pick up a certain amount of water as a result of the processing. It is desired, however, that this increase in weight is minimal.

It should be appreciated that the invention provides for the surface treatment of the animal tissue. It is not desirable to treat the animal tissue to a depth below about 4 mm from the surface of the animal tissue. It is expected that if surface treatment extends beyond about 4 mm, the organoleptic properties of the animal tissue will be compromised.

An alternative way of characterizing the surface treatment of animal tissue within the pasteurization unit is in terms of the ratio of the flow rate of heated water into the pasteurization unit to the flow rate of animal tissue into the pasteurization unit. In order to provide desired degree of surface treatment of the animal tissue, enough heat energy needs to be introduced into the pasteurization unit. Too much heat energy, however, will result in cooking the animal tissue or deterioration of organoleptic properties of the animal tissue. It should be appreciated that the desired flow ratio of water to animal tissue is a function of the temperature of the water bath within the pasteurization unit, the length of time the animal tissue will remain within the pasteurization unit, and the temperature of the animal tissue upon entry into the pasteurization unit. In the case of poultry, the animal tissue is often processed relatively shortly after the slaughter operation. Accordingly, the temperature of poultry which has been recently slaughtered and after removal of the feathers is between about 30° C. and about 40° C. In contrast, beef trimmings are generally cooled or chilled to a temperature of between about 0° C. and about 10° C. prior to introduction into the pasteurization unit. It should be appreciated that a higher flow rate of water may be appropriate for a lower temperature animal tissue. In contrast, a lower flow rate of water may be appropriate for a hotter temperature animal tissue. Furthermore, the flow rate of water will be affected by the temperature of the water introduced into the pasteurization unit and the temperature of the water maintained within the pasteurization unit. In general, under conditions of providing a bath at between about 80° C. and about 110° C. and introducing animal tissue at a temperature of between about 0° C. and about 40° C., it is desirable to provide a flow rate ratio of water to animal tissue of between about 0.05 gallon of water per pound animal tissue to about 0.2 gallon of water per pound animal tissue. Preferably, the flow ratio is between about 0.10 gallon of water per pound animal tissue and about 0.15 gallon of water per pound of animal tissue. Applicants have found that a most preferred flow ratio is between about 0.11 gallon of water per pound of animal tissue and about 0.13 gallon of water per pound of animal tissue.

By way of illustration, the pasteurization unit can be used to process 14,000 pounds of animal tissue per hour and provided at a temperature of between about 0° C. and about 10° C. by introducing 1700 gallons of water provided at a temperature of between about 80° C. and about 110° C. It is expected that with such a flow rate of water, about 1550 gallons per hour will be provided as recirculated water, and about 150 gallons per hour will be provided as make-up water. Surface treating about 10,000 pounds per hour provided at a temperature of between about 0° C. and about 10° C. can include introducing about 1100 gallons of water per hour provided at a temperature of between about 80° C. and about 110° C. Of that amount, about 1000 gallons can be recirculated water and about 100 gallons can be make-up water.

While a preferred embodiment of the invention is described in the context of hot water as a heating media, it should be appreciated that other types of heating media can be used according to the invention. In general, it is preferable to use a heating media which provides sufficiently fast heat transfer to the surface of the animal tissue. The heating media can be referred to as the bath. The heat transfer coefficient of a media reflects the relative ability of the media to transfer its heat energy to another substance. The heat transfer coefficient of boiling water is significantly higher than convective oil. The average heat transfer coefficient for boiling water is 20 times greater than for convective oil. In the situation where tallow is used as the heating media and where it is provided at a temperature in the range of between about 80° C. and 110° C., it may be appropriate to surface treat animal tissue for between about 25 seconds and 150 seconds. Because the heat transfer coefficient of tallow is less than the heat transfer coefficient of water, it may be appropriate to alternatively increase the temperature of the tallow to provide the desired lethal effect under treatment times similar to that used when water is the heating media. For example, tallow can be provided at a temperature of less than about 150° C. if it is desirable to provide surface treatment of the animal tissue for less than 150 seconds. When the tallow is provided at such a higher temperature, it may be desirable to reduce the treatment time to between about 25 seconds and about 50 seconds.

The pasteurization technique of the invention is useful for processing beef trimmings for ground beef manufacture, offal, and variety meats. The pasteurization technique of the invention is particularly useful for low temperature rendering applications because of the potential risks associated with heating raw meat products from 4° C. to 42° C. and the potential growth of pathogenic bacteria at these sub-lethal temperatures. Low temperature rendered products (Finely Textured Beef and Partially Defatted Chopped Beef) are primarily used as components of ground beef, beef pattie, and further processed meat products. The addition of a pasteurization step prior to the low temperature rendering process would lower the risk of pathogenic bacteria entering the system.

EXAMPLE 1

Time-temperature Lethality Study

Product Treatment

A Blentech ContinuTherm™ continuous thermal screw was used having a screw conveyor immersed in a heating media. The heating media used in the testing was either hot water or hot tallow. The treatment time is controlled by the rotational speed of the screw conveyor. The treatment times used in this study were 30, 45, or 90 seconds. The products tested were fresh beef trimmings containing 90%, 50%, or 30% lean. The following product-time-media combinations were tested:

| Product | Time, seconds | Media |
| --- | --- | --- |
| 90% lean | 30, 45, and 90 | Hot Water |
| 50% lean | 30, 45, and 90 | Hot Tallow |
| 30% lean | 30, 45, and 90 | Hot Tallow |

Microbiological Analysis

The products were sampled before and after treatment to determine the reduction effect of the time-treatment combination. The products were sampled by randomly selecting approximately 1200 g of product and grinding (3 mm plate) twice through a small meat grinder, which had been heat sterilized. The sample was then aseptically mixed and a 20 g sample was removed. This sample was placed in a stomacher bag into which 180 mls of sterile 0.1% peptone water was added. The sample was then homogenized in a stomacher for 60 seconds. The samples were then serially diluted and plated on Petrifilm™ according to the manufacturer's recommendations (3M, 1997). Aerobic Plate Count, Coliform, and $E.\ coli$ (Biotype I). All results were expressed and analyzed as log $CFU/cm^2$. The lowest detection limit of this test was 1 log CFU/g.

Data Analysis

Before and After treatment data were analyzed using a paired t-test (P<0.01) to determine if the treatment resulted in a significant reduction. Significant treatment time differences, within product-media combinations, were determined using least significant differences comparisons (P<0.01).

Two heating medias (water and oil) in combination with three treatment times (30, 45, and 90 seconds) were studied. Table 1 shows the Aerobic Plate Count reductions. All treatments showed significant Aerobic Plate Count reductions (P<0.05). Since different products were tested for each heating media, comparisons were not made between media types. Increased treatment time did not increase lethality within media-product combinations except for the hot tallow-30% lean combination. The Coliform and $E.\ coli$ counts were too low to analyze for reductions. Table 2 shows the percent of samples with detectable Coliform and $E.\ coli$.

TABLE 1

Aerobic Plate Count Reductions

| N | Product, % lean | Media | Trt Time, seconds | Before Treatment, log $CFU/cm^2$ | After Treatment, log $CFU/cm^2$ | Reduction, log $CFU/cm^2$ |
| --- | --- | --- | --- | --- | --- | --- |
| 12 | 90% | Water | 30 | 5.23 | 2.91 | 2.32 |
| 6 | 90% | Water | 45 | 5.56 | 2.65 | 2.91 |
| 6 | 90% | Water | 90 | 6.12 | 3.32 | 2.8 |
| 14 | 50% | Tallow | 30 | 3.72 | 2.76 | 0.96 |
| 8 | 50% | Tallow | 45 | 3.11 | 2.08 | 1.03 |
| 6 | 50% | Tallow | 90 | 4.1 | 3.21 | 0.88 |
| 14 | 30% | Tallow | 30 | 7.19 | 5.79 | 1.39 |
| 8 | 30% | Tallow | 45 | 8.08 | 6.69 | 1.39 |
| 6 | 30% | Tallow | 90 | 6.2 | 4 | 2.2 |

| N | Product, % lean | Media | Trt Time, seconds | Coliform Before, % | Coliform After, % | $E.\ coli$ (Biotype I) Before, % | $E.\ coli$ (Biotype I) After, % |
| --- | --- | --- | --- | --- | --- | --- | --- |
| 12 | 90% | Water | 30 | 75 | 17 | 92 | 33 |
| 6 | 90% | Water | 45 | 100 | 0 | 100 | 0 |
| 6 | 90% | Water | 90 | 67 | 17 | 100 | 33 |
| 14 | 50% | Tallow | 30 | 36 | 14 | 0 | 0 |
| 8 | 50% | Tallow | 45 | 100 | 0 | 0 | 0 |
| 6 | 50% | Tallow | 90 | 12.5 | 0 | 0 | 0 |
| 14 | 30% | Tallow | 30 | 43 | 43 | 7 | 0 |
| 8 | 30% | Tallow | 45 | 12.5 | 0 | 0 | 0 |
| 6 | 30% | Tallow | 90 | 100 | 0 | 0 | 0 |

*All reductions were significant (P <.05)

EXAMPLE 2

Water Absorption Study

Product Treatment

Fresh beef trimmings (90% lean and 50% lean) were cut and assigned to one of three treatment groups based on piece size (5 $cm^3$, 10 $cm^2$ by 7.6 cm, or 15 $cm^2$ by 7.6 cm). The pieces were then weighed, treated in boiling water for 30 seconds, and weighed after treatment. The scale accuracy was +/−1.5 grams. Samples were gently turned to allow excess free water to drain from the sample. No vigorous action was used to free water.

Data Analysis

Data were analyzed using least significant differences multiple comparison to determine significant differences between treatments. Simple correlation analysis was used to determine if any relationships existed between initial piece weight and water absorption.

Water absorption was not correlated to piece size. No significant differences were detected between lean type or piece size. The samples in this test were gently turned to allow free water to drain. We speculate that aggressive shaking would result in lower water absorption. The data is shown in Table 3.

TABLE 3

Percent Water Absorption in Fresh Beef Trimmings Treated in Hot Water

| Piece Size | n | 90 Lean Beef Trim | 50 Lean Beef Trim | Average |
|---|---|---|---|---|
| 5 cm$^3$ | 16 | 0.88 | 1.2 | 1.04 |
| 10 cm$^2$ × 7.6 cm | 16 | 0.17 | 0.82 | 0.5 |
| 15 cm$^2$ × 7.6 cm | 10 | (0.11) | 3.24 | 1.57 |
| Average | | 0.37 | 1.53 | 0.95 |

EXAMPLE 3

Pathogen Challenge Study

Product Treatment

This study utilized beef lean (*Cutaneous truncii*) and adipose tissue (subcutaneous tissue covering the *Longissimus dorsi*). These samples were cut to approximately 20 cm by 20 cm then inoculated with a mixture of *Salmonella typhimurium, Escherichia coli* 0157:H7, and *Listeria monocytogenes*. Three replicates of each treatment were performed on each of three days (n=9). However, due to a lab error the *E. coli* 0157:H7 culture was omitted during two of the days resulting in n=9 for *S. typhimurium* and *L. monocytogenes*, and n=3 for *E. coli* 0157:H7. The lean and adipose samples were randomly assigned to each of two treatments. This resulted in four treatment-tissue combinations (Water-Lean, Water Adipose, Tallow-Lean, and Tallow-Adipose). Immediately prior to treatment four cores (11.4 cm$^2$ each) were removed for microbial analysis (BEFORE).

For the water treatment individual samples were immersed for 30 seconds in boiling water (approximately 98° C.). During the treatment the water temperature decreased to approximately 96° C. as energy was absorbed by the sample. The water treatment apparatus consisted of an eight liter stainless steel container with approximately five liters of tap water placed on a laboratory hot plate. Immediately following treatment four cores (11.4 cm$^2$ each) were removed (AFTER).

The tallow treatment involved immersing individual samples in hot beef tallow (121° C.) for 45 seconds. The apparatus consisted of a stainless steel eight liter container filled with approximately five liters of beef tallow. This container was placed in a heated bath of corn oil. The corn oil was maintained at the desired temperature (121° C.) and used to heat the tallow. During treatment the tallow temperature dropped to approximately 118° C.

Microbiological Analysis

Culture Preparation

Stock cultures of *Listeria monocytogenes* Scott A, *Escherichia. coli* 0157:H7 (rifampicin resistant) and *Salmonella typhimurium* (naladixic acid resistant) were transferred to tryptic soy broth or tryptic soy broth with 0.6% yeast extract (*L. monocytogenes*) and incubated overnight at 37° C. 0.5 ml portions of each of the overnight cultures were transferred to individual flasks containing 33.5 mls of tryptic soy broth (with yeast extract for *L. monocytogenes*) and incubated in a gyro-rotary shaker incubator at 37° C. for 24 hours at 115 rpm. The overnight cultures were then combined in 1000 mls of sterile distilled water to produce the mixed inoculum for the tissue.

Tissue Inoculation

Lean and adipose tissues were inoculated by immersion for 5 minutes, turning each of the pieces over at 2.5 minutes. The inoculated samples were allowed to drain approximately 2 minutes, then covered and were held refrigerated (5° C.) for approximately 18 hours to allow for attachment of the microorganisms. The target inoculation level was 5 log.

Sampling

Prior to treatment (BEFORE) and after treatment (AFTER), each tissue was sampled by removing 2 cores from diagonal corners. The cores were aseptically excised all of the way through each tissue piece, such that each core consisted of two external inoculated surfaces. The area of each surface was 11.4 cm$^2$, so that each core represented 22.8 cm$^2$ of surface. The two cores were composited into a single sample, such that the composite sample represented 45.6 cm$^2$.

Bacterial Enumeration

The composite samples were homogenized in sterile, buffered 0.1% peptone water for 2 minutes in a stomacher. The samples were serially diluted in buffered peptone water, and then spiral plated using either a Model D or AutoPlate 3000. Bacterial populations were enumerated using tryptic soy agar (Aerobic Plate Count), XLD agar containing 200 ppm naladixic acid (Salmonella), Listeria selective agar (modified Oxford formulation; Listeria) and Sorbitol MacConkey Agar containing 200 ppm rifampicin (*E. coli* 0157:H7). The plates were incubated at 37° C. for 24–48 hours, and the estimates of the bacterial populations converted to log colony forming units per cm$^2$ (log CFU/cm$^2$). Bacterial reductions were calculated by subtracting the AFTER results from the BEFORE results. Percent pathogen reduction was calculated from the integer value.

Data Analysis

Before and After treatment data were analyzed using a paired t-test (P<0.01) to determine if the treatment resulted in a significant reduction. Treatment differences were analyzed for using a one-way ANOVA.

Both the hot water and the hot tallow treatments were successful in reducing the pathogenic bacteria in this test. All treatments showed significant reductions of all pathogens tested. Water had a significantly higher lethality for *Listeria monocytogenes* than tallow. Tables 4, 5, and 6 show the results from these treatments.

TABLE 4

*Salmonella typhimurium*
Reduction Using Pasteurization Process

| Treatment | Before Treatment, log CFU/cm² | After Treatment, log CFU/cm² | Reduction, log CFU/cm² | Reduction, % |
|---|---|---|---|---|
| Water-Lean | 4.81 | 3.47 | 1.34 | 95.4 |
| Water-Adipose | 5.93 | 3.04 | 2.9 | 99.9 |
| Tallow-Lean | 5.91 | 4.44 | 1.47 | 96.6 |
| Tallow-Adipose | 5.73 | 4.38 | 1.35 | 95.5 |

Nine replicates
Water treatment-98° C., 30 seconds
Tallow treatment-121° C., 45 seconds

TABLE 5

*Listeria monocytogenes*
Reduction Using Pasteurization Process

| Treatment | Before Treatment, log CFU/cm² | After Treatment, log CFU/cm² | Reduction, log CFU/cm² | Reduction, % |
|---|---|---|---|---|
| Water-Lean | 6.37 | 4.18 | 2.19 | 99.4 |
| Water-Adipose | 6.61 | 4.48 | 2.13 | 99.3 |
| Tallow-Lean | 6.38 | 5.33 | 1.05 | 91.1 |
| Tallow-Adipose | 6.67 | 5.71 | 0.96 | 89 |

Nine replicates
Water treatment-98° C., 30 seconds
Tallow treatment-121° C., 45 seconds

TABLE 6

*Escherichia coli* 0157:H7
Reduction Using Pasteurization Process

| Treatment | Before Treatment, log CFU/cm² | After Treatment, log CFU/cm² | Reduction, log CFU/cm² | Reduction, % |
|---|---|---|---|---|
| Water-Lean | 4.68 | 2.74 | 1.94 | 98.9 |
| Water-Adipose | 4.64 | 2.64 | 2 | 99 |
| Tallow-Lean | 5.39 | 3.93 | 1.46 | 96.5 |
| Tallow-Adipose | 4.34 | 3.3 | 1.04 | 90.9 |

Nine replicates
Water treatment-98° C., 30 seconds
Tallow treatment-121° C., 45 seconds Both hot water and hot tallow treatment showed significant reductions in Aerobic Plate Count, *Salmonella typhimurium, Listeria monocytogenes*, and *Escherichia coli* 0157:H7.

Increasing treatment times did not significantly improve APC reductions, therefore 98° C. for 30 seconds was chosen as the treatment for the hot water pathogen study. Equipment limitations required that the tallow temperature be reduced to 121° C. The tallow pathogen study was conducted at 121° C. for 45 seconds.

Hot water treatment caused minimal water absorption. This water absorption can be reduced by mechanical action.

Hot water treatment consistently resulted in higher pathogen lethality. The increased lethality was attributed to a much higher heat transfer coefficient for boiling water. Hot water treatment is also more energy efficient and is much easier to handle than tallow (data not shown).

We claim:

1. A method for surface treating animal tissue, the method comprising steps of:
   (a) introducing beef trimmings from a fabrication operation and having an average size of between about 0.5 inch and about 16 inches in length into a water bath provided at a temperature of between about 80° C. and about 110° C. for between about 25 seconds and about 50 seconds;
   (b) conveying the beef trimmings through the water bath in a first in and first out arrangement by turning a rotation screw;
   (c) recovering the beef trimmings from the water bath; and
   (d) collecting processing water from the water bath, separating fat from the processing water by phase separation, and returning the processing water to the water bath.

2. A method for surface treating animal tissue according to claim 1, wherein the step of conveying the beef trimmings through the water bath comprises turning a rotation screw having a spiral flight extending through the water bath for advancing the beef trimmings.

3. A method for surface treating animal tissue according to claim 2 comprising rotating the rotation screw at a rate of between 1 revolution per minute and 20 revolutions per minute.

4. A method according to claim 1, further comprising a step of:
   (a) processing the recovered beef trimmings to provide ground beef.

5. A method according to claim 1, wherein the beef trimmings are provided at a temperature of between about 0° C. and about 10° C. before being introduced into the water bath.

6. A method for surface treating animal tissue according to claim 1, wherein the beef trimmings have an average size of between about 0.25 lb. and about 12 lbs.

7. A method for surface treating animal tissue, the method comprising steps of:
   (a) introducing beef trimmings from a fabrication operation and having an average size of between about 0.25 lb. and about 12 lbs. per piece of beef trimmings into a water bath provided at a temperature of between about 80° C. and about 110° C. for between about 25 seconds and about 50 seconds;
   (b) conveying the beef trimmings through the water bath in a first in and first out arrangement by turning a rotation screw;
   (c) recovering the beef trimmings from the water bath; and
   (d) removing processing water from the water bath, separating fat from the processing water by phase separation, and returning the processing water to the water bath.

8. A method for surface treating animal tissue according to claim 7, wherein the step of conveying the beef trimmings through the water bath comprises turning a rotation screw having a spiral flight extending through the water bath for advancing the beef trimmings.

9. A method for surface treating animal tissue according to claim 8 comprising rotating the rotation screw at a rate of between 1 revolution per minute and 20 revolutions per minute.

10. A method according to claim 7, further comprising a step of:
    (a) processing the recovered beef trimmings to provide ground beef.

11. A method according to claim 7, wherein the beef trimmings are provided at a temperature of between about 0° C. and about 10° C. before being introduced into the water bath.

12. A method for surface treating animal tissue, the method comprising steps of:
   (a) introducing beef trimmings from a fabrication operation and having an average size of between about 0.5 inch and about 16 inches in length into a water bath provided at a temperature of between about 80° C. and about 110° C. for between about 25 seconds and about 50 seconds;
   (b) conveying the beef trimmings through the water bath in a first in and first out arrangement, the animal tissue being conveyed through the water bath by turning a rotation screw having a spiral flight for advancing the beef trimmings through the water bath, wherein the rotation screw is rotated at a rate of between about 1 revolution per minute and about 20 revolutions per minute; and
   (d) recovering the beef trimmings from the water bath.

13. A method according to claim 12, wherein the beef trimmings are provided at a temperature of between about 0° C. and about 10° C. before being introduced into the water bath.

14. A method according to claim 12, further comprising a step of:
   (a) processing the recovered beef trimmings to provide ground beef.

15. A method according to claim 12, wherein the beef trimmings have an average size of between about 0.25 lb. and about 12 lbs.

* * * * *